United States Patent [19]

Hahne et al.

[11] Patent Number: 5,072,443
[45] Date of Patent: Dec. 10, 1991

[54] COMMUNICATIONS SYSTEM

[75] Inventors: Ellen L. Hahne, Westfield; Nicholas F. Maxemchuk, Mountainside, both of N.J.

[73] Assignee: AT&T Bell Laboratories, Murray Hill, N.J.

[21] Appl. No.: 387,247

[22] Filed: Jul. 28, 1989

[51] Int. Cl.⁵ .............................. H04J 3/02; H04J 3/16
[52] U.S. Cl. .................................. 370/85.9; 370/85.7; 370/85.4
[58] Field of Search .................... 370/85.1, 859, 85.11, 370/85.12, 94.1, 94.2, 94.3, 60, 60.1, 95.1, 95.2, 95.3, 85.7, 86.4

[56] References Cited

U.S. PATENT DOCUMENTS

| 4,759,017 | 7/1988 | Allan et al. | 370/85.11 |
| 4,922,244 | 5/1990 | Hullett et al. | 370/85.12 |
| 4,926,418 | 5/1990 | Cidon et al. | 370/85.12 |
| 4,933,935 | 6/1990 | Adam | 370/85.7 |

OTHER PUBLICATIONS

"A Fair MAC Access Scheme," M. A. Rodrigues, S. K. Kar, Contribution to the IEEE 802.6 Working Group, Document Number: 802.6-88/62, Jul. 5, 1988.
"Bottleneck Flow Control," Jeffrey M. Jaffe, IEEE Transactions on Communications, vol. COM-29, No. 7, Jul. 1981, pp. 954–962.
"The $p_i$-Persistent Protocol for Unidirectional Broadcase Bus Networks," B. Mukherjee and J. S. Meditch, IEEE Transactions on Communications, vol. 36, No. 12, Dec. 1988, pp. 1277–1286.
"The QPSX Man", R. M. Newman, Z. L. Budrikis and J. L. Hullett, IEEE Communications Magazine, vol. 26, No. 4, Apr. 1988, pp. 20–28.
"Access Protection for Fairness in a Distributed Queue Dual Bus Metropolitan Area Network," J. Filipiak, CH2655-9/89/0000-0635, 1989 IEEE, pp. 0635–0639.

Primary Examiner—Benedict V. Safourek
Assistant Examiner—Wellington Chin
Attorney, Agent, or Firm—Henry T. Brendzel

[57] ABSTRACT

A potential transmission-access failing in the IEEE 802.6 protocol is remedied by the use of terminals that sense the activity level on the interconnecting communications lines. In response to conditions that may give rise to such a failing, each terminal throttles its own transmission rate to improve the transmission capacity allocation of the protocol. In one embodiment, the terminal that transmits over more than half of the slots in the round trip delay simply throttles itself to one half the slots when it detects that another terminal is transmitting or is wishing to transmit. In another embodiment, even a terminal that is transmitting over over fewer than half the slots in the round trip delay determines the number of unoccupied slots and throttles itself to transmit over not more than half of the number of available slots. In still another embodiment, a terminal wishing to transmit many packets casts a number of reservation bits onto the transmission channel to insure for itself some transmission capacity. The number of reservation bits sent is equal to a fraction of the available slots. In yet another embodiment, each terminal throttles itself to take no more than a specified fraction of the remaining transmission capacity.

23 Claims, 3 Drawing Sheets

COMMUNICATIONS SYSTEM

BACKGROUND OF THE INVENTION

This relates to packet communications and more particularly to improvements in the protocols associated with distributing the transmission resources among interconnected terminals.

A communications network is created physically by interconnecting terminals with communications channels. There are many such arrangements. To make these arrangements work, a protocol must be established to insure orderly communications. Many protocols are possible and, of course, some are better than others. It has long been recognized that standardization of protocols is beneficial to the industry and, in the United States, the IEEE 802.6 protocol is one such protocol. IEEE Standard. Distributed Wueue Dual Bus (DQDB) Metropolitan Area Network (MAN). 1988. Draft D.O, June 24, 1988.

The IEEE 802.6 Protocol is designed for transmission of packetized data in an arrangement not unlike the one depicted in FIG. 1. There, a plurality of terminals 10.1, 10.2, 10.3, ... 10.N are interconnected via unidirectional buses 11 and 12. Bus 12 starts at terminal 10.1 and proceeds towards terminal 10.N in a "daisy chain" fashion, passing by the intermediate terminals. Bus 11 is similarly arranged, except that data flows from terminal 10.N towards 10.1. The information on buses 11 and 12 is arranged in time slots. Each time slot is designed to hold a packet of information in a data area. Each time slot also has a control area which includes a busy bit and a reservation bit. Each terminal, such as terminal 10.2, includes at least three elements: a source device 13, a transmitter-receiver module 14 and a transmitter-receiver module 15. Through module 14, source 13 of a terminal can couple packets onto bus 12 when it wishes to transmit information to a terminal on its right (i.e., down-stream) and when empty slots are available on the bus. Source 13 can, of course, be a "dumb" terminal, a computer, or a gateway to another network. When a terminal wishes to send a packet on bus 12, module 15 couples a reservation bit on bus 11. Placing a reservation bit on bus 11 causes all of the up-stream terminals (with reference to bus 12 and with respect to the terminal that sends the reservation bit) to make sure that each of them allows an empty data slot to pass unpopulated. This insures the existence of an empty slot on bus 12 and, therefore, the terminal that sent the reservation bit is able to load data into such an empty slot. The protocol is exactly the same when a terminal wishes to send packets to a terminal on its left, except that the roles of buses 11 and 12 and modules 14 and 15 are reversed.

For purposes of simplicity, the following discussion presumes only transmission of packets on bus 12, and the terms "down-stream" are with reference to bus 12.

In operation, a terminal i casts a packet of data onto bus 12 only when a free slot is available and enough reserved empty slots were allowed to pass without being populated so that terminals to the right of terminal i ("downstream" from terminal i), can populate the empty slots with awaiting packets. When information is inserted into an empty slot, the busy bit is set to 1. The fact that a packet awaits to be transmitted is communicated to up-stream terminals by a reservation bit that is coupled (i.e., set to 1) to the reservation bit position of a slot that passes by module 15 on bus 11 and which has an unset reservation bit.

More specifically, each transmitter-receiver module of a terminal contains a Request counter and a Count-down counter. When no data is to be transmitted by the terminal, the Count-down counter is not used. Reservation bits arriving at bus 11 increment the Request counter, and empty slots that pass unpopulated on bus 12 decrement the Request counter. In this manner, the value of the Request counter is indicative of the number of data slots that still must be passed unpopulated in order to satisfy the needs of down-stream terminals. When the terminal wishes to send a packet on bus 12, the contents of the Request counter are transferred to the Count-down counter, thereby capturing the value within the Request counter. The Request counter is reset at that time and the Count-down counter rather than the Request counter is decremented with every passing empty slot on bus 12. Reservation bit arriving at bus 11 continue to increment the Request counter. When the value in the Count-down counter reaches 0, the awaiting packet of the terminal is placed on the very next empty slot of bus 12. At that time, should there be another packet that is to be transmitted, the Request counter contents are again transferred to the Count-down counter and the process repeats. When no additional packets are to be transmitted, the operation reverts to the original mode, where the Request counter is decremented with each passing unpopulated slot on bus 12.

When terminals are separated by a considerable distance and each would like to transmit packets as quickly as possible, a problem can arise with protocol IEEE 802.6. To appreciate the potential problem it is helpful to keep in mind some typical system parameters. In a typical system, the transmission rate is $150 \times 10^6$ bits per second, the speed of light in the medium is $2.4 \times 10^8$ meters per second, and the slot size is 64 bytes (8 bits each). This translates to approximately 60 packets in transit on a 50 km link. Actually, more packets are in transit then this number because the coupling process in each terminal in the FIG. 1 arrangement introduces some delay (in modules 15 and 14). That means that for a 50 kilometer distance between terminals 10.1 and 10.N, the channel which comprises buses 11 and 12 may contain, perhaps, 126 packets in transit. This number is assumed in the discussion below, for sake of convenience.

A problem arises with the IEEE 802.6 protocol when two or more widely separated terminals desire to transmit large files (i.e., they wish to do a bulk transfer) and an up-stream terminal starts its transmission more than 63 time slots before the other. Such a terminal transmits on all time slots because no slots have been reserved by other terminals. Sometime later, when terminal 10.N−1 wishes to transmit information (e.g., to terminal 10.N), it finds all incoming slots busy. In accordance with protocol IEEE 802.6, it places a reservation bit on bus 11 for its first packet and waits for an empty slot to appear on bus 12. In the meantime, terminal 10.1 continues to populate empty slots until, 63 time slots later, it recognizes the reservation bit inserted by terminal 10.N−1 on bus 11 and allows one empty slot to pass on bus 12 unpopulated. It takes 63 additional time slots before that empty slot finally arrives at terminal 10.N−1. The result is that terminal 10.1 is able to transmit 125 packets for each packet transmitted by terminal 10.N−1.

This clear unfairness in the allocation of the available capacity (time slots) needs to be addressed.

SUMMARY OF THE INVENTION

The potential unfairness in the division of the transmission capacity that is presently found in protocol IEEE 802.6 is overcome, in accordance with the principals of this invention, by each terminal developing a measure of the transmission load that it may acquire based on the activity level of its source and the activity level of other terminals. In response to these determinations, each terminal throttles its own transmission rate to improve the overall fairness of the protocol. In one embodiment, the terminal that transmits over more than half of the slots in the round trip delay simply throttles itself to one half the slots if it detects that another terminal is transmitting or is wishing to transmit. In another embodiment, even a terminal that is transmitting over fewer than half the slots in the round trip delay determines the number of available slots and throttles itself to transmit over not more than half of the number of unoccupied slots. In still another embodiment, a terminal wishing to transmit many packets casts a number of reservation bits onto the transmission channel to insure for itself some transmission capacity. The number of reservation bits sent is equal to a fraction of the available slots. In yet another embodiment, each terminal throttles itself to take no more than a specified fraction of the remaining transmission capacity.

DETAILED DESCRIPTION

Our basic approach for overcoming the potential problem of unfair allocation of the transmission capacity is to force each active terminal to throttle its own transmission so that it is precluded from amassing an undue proportion of the network's capacity.

Figure 2:
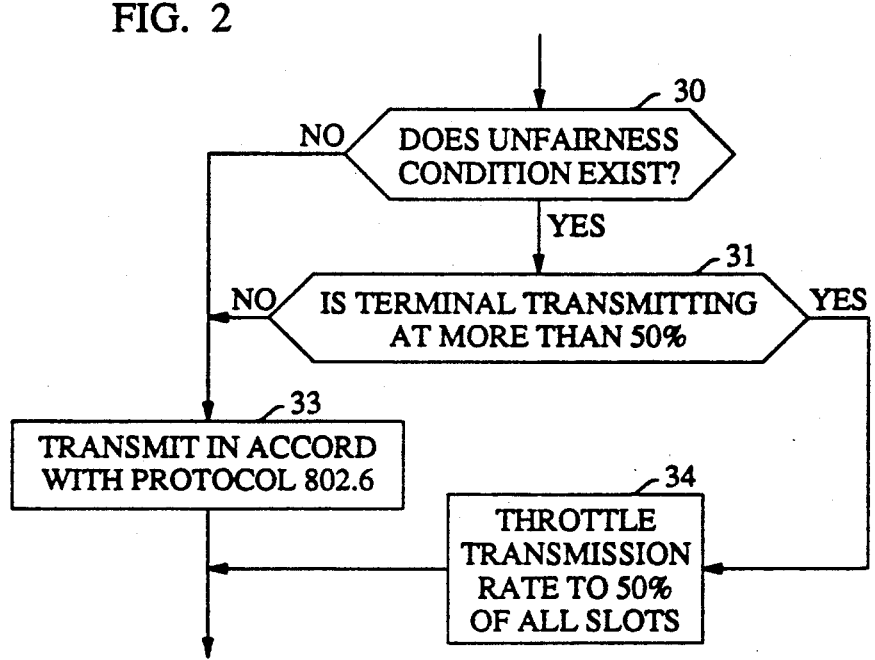
FIGS. 2, 4–7 present various flow diagrams that describe the modification to the protocol which improve the fairness of capacity allocation in the presence of terminals that wish to execute bulk transfers.

A flowchart depicting the improvements offered by one of our approaches is presented in FIG. 2. Within block 30, a determination is made whether an unfairness condition exists on bus 12. When such a condition exists, block 31 determines whether the terminal may need to modify its own transmission rate. If it is determined that the terminal is transmitting at more than one half the transmission capacity, then block 34 throttles the transmission rate of the terminal to one half the transmission rate of the network. In all other cases, control passes to block 33 which permits transmission in accord with protocol 802.6.

In connection with block 30, one clear way to determine that an "unfairness condition" exists is when all of the slots are used and when there is more than one source transmitting, or wishing to transmit information. A terminal can make this assessment by adding (over a period T of slot times where T is greater than a round-trip delay) the busy bits inserted by upstream terminals, the busy bits inserted by the local source, and the reservation bits seen by module 15 (which were previously inserted by downstream terminals on bus 11). The resulting sum, compared to the number of available slots in T, provides a measure of the load on bus 12. If over a period T that is greater than the roundtrip delay the value of the sum at terminal i is less than the number of slots that are available within period T, then no unfairness condition exists. Otherwise, it can be said that an unfairness condition exists, unless there is only one terminal that is transmitting. The latter condition can be detected at the transmitting terminal by noting that bus 12 contains no busy bits from upstream terminals and bus 11 contains no reservation bits from downstream terminals.

The period T that is examined should be equal to or greater than the maximum roundtrip delay in the network in order to let all of the reservation bits be seen by each terminal at least once.

Figure 3:
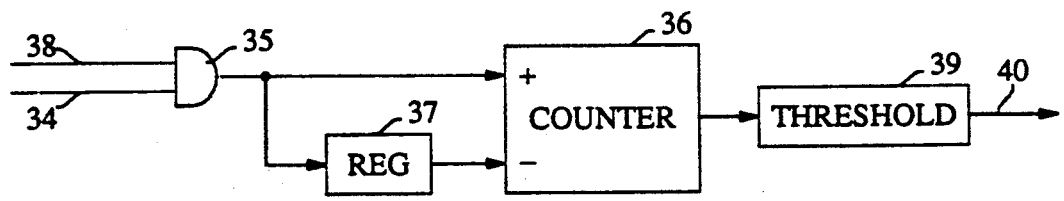
FIG. 3 depicts a circuit, to be included in each terminal, for determining the number of available slots in a selected time interval.

FIG. 3 illustrates a simple circuit that can develop the aforementioned sum within each module 14. In accordance with FIG. 3, the busy and reservation bits of lines 34 and 38, respectively, which pass through gate 35 are used to increment counter 36. Gate 35 causes counter 36 to increment by one when either an active reservation bit or an active busy bit is present, or increment by two when both are present. The bits exiting gate 35 are also injected into shift register 37 which corresponds in length to the number of slots in time interval T. After time interval T, the very same bits exit shift register 37 and decrement counter 36. In this manner, counter 36 maintains an accurate count of the number of busy and reservation bits that appear at lines 34 and 38. A threshold circuit 39 at the output of counter 36 can easily develop an output signal at line 40 that indicates whether the sum is below the number of slots in T. For the above example of 126 slots in the roundtrip delay, T can be chosen to be 128. When this number is chosen, since it is binary, circuit 39 can be dispensed with because the 8th bit of counter 36 provides the desired information.

To summarize, one approach for solving the flow control problem is for a terminal to detect whether it should throttle itself down by determining whether its rate is greater than some fraction (e.g., larger than ½), reservation or busy bits are found on the buses, and the system is full. When this condition is detected, the terminal reduces its own transmission rate to a predetermined fraction (such as ½) of the number of slots available in T. In the case where the fraction ½, since only one terminal can acquire more than half of the slots, it follows that only one terminal must adjust its rate of transmission. Therefore, it doesn't matter that different terminals can detect the unfair condition at different times, and there is no danger of overcompensating.

Figure 4:
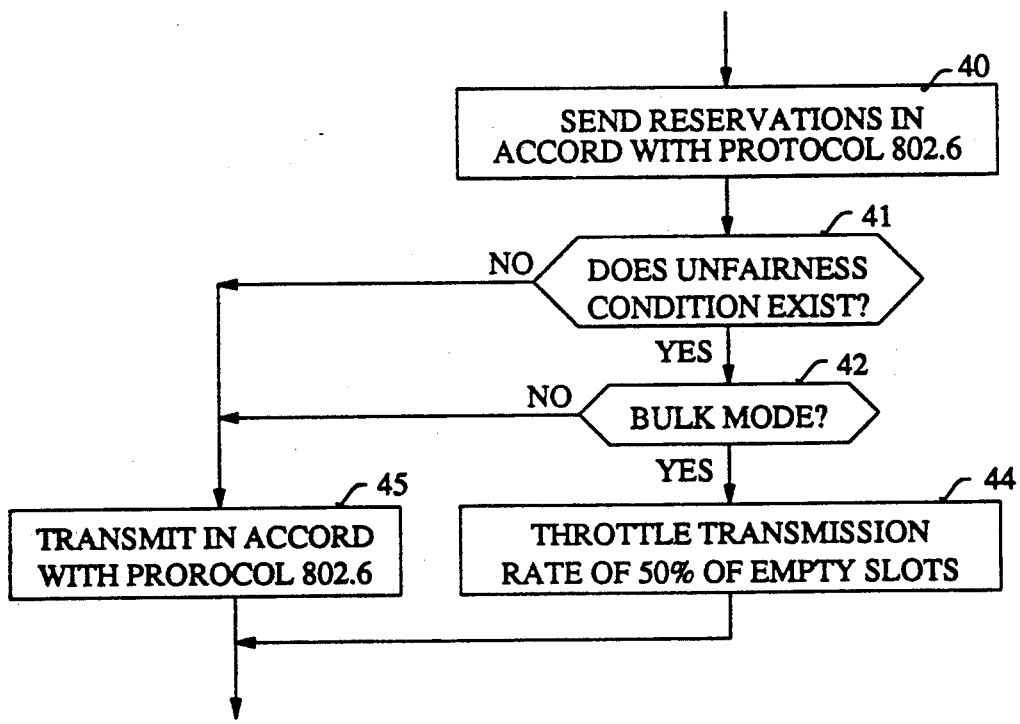

In the above approach, when two terminals are in a bulk transfer mode, one terminal acquires half the capacity, and the remainder of the capacity is divided among the remaining terminals, which includes the other terminal that is in a bulk transfer mode. Although, such operation is fairer than the operation of a totally unconstrained system, it may be made fairer still by constraining a terminal to acquire at most half of the data slots that are not already used by upstream terminals. Of course, such constraining should be undertaken only when unfairness occurs and there is at least one active downstream terminal left. In this manner, when three terminals are in a bulk transfer mode, the capacity is divided among them with ½ for the first terminal, ¼ for the second terminal, and the remaining ¼ for the third terminal and beyond. The flowchart for this modified approach, shown in FIG. 4, is similar to that of FIG. 2, except that block 44 throttles down to a different level than block 34.

To generalize, the above-described specific approaches solve the potential unfairness problem of the protocol by permitting a terminal to control its transmission rate through observations of the overall state of transmissions over the network (i.e., the actual and the expected occupancy level on bus 12). That is not, however, the only approach that can be employed in accord with the principles of our invention. Specifically, it may be observed that the transmission rate of a terminal can be controlled by merely considering the reservation bits that are received on bus 11, because those reservation bits require the terminal to let a number of empty slots to pass without being populated. In this manner, a downstream terminal can control the transmission rate of an upstream terminal.

One technique for flow control in accordance with the reservation bits approach may be, for example, for each terminal that wishes to do a bulk transfer to send reservation bits on bus 11 in proportion to the number of unset reservation bits on bus 11. For instance, each such terminal could set on bus 11 the reservation bit of every other slot that does have a set reservation bit. The circuitry for that (included in module 15) is completely conventional.

Figure 1:
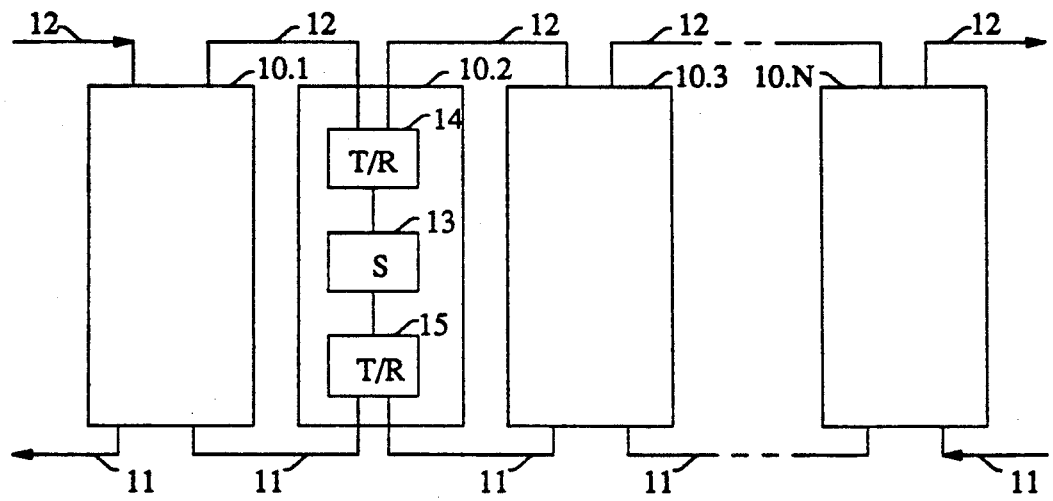
FIG. 1 illustrates the communications environment of protocol IEEE 802.6.

For example, if terminals 10.N and 10.N−2 (not shown in FIG. 1) were in a single packet mode and terminals 10.N−4 (also not shown in FIG. 1) and terminal 10.3 were in a bulk transfer mode, then the following would occur. Terminals 10.N and 10.N−2 would each send a reservation bit because each has a packet it wishes to transmit, and terminal 10.N−4 would send a reservation bit on every other slot that has an unset reservation bit, thereby sending 62 reservation bits over a 126 time slot interval. Terminal 10.3 would send a reservation bit on every other remaining slot that has an unset reservation bit, which translates to sending 31 reservation bits over a 126 time slot interval. Terminal 10.2 would then be required to pass 95 unpopulated time slots, terminal 10.3 would populate 31 time slots and pass 64 unpopulated time slots, and terminal 10.N−4 would populate 62 time slots and pass two unpopulated time slots for terminals 10.N−2 and 10.N.

This technique for flow control basically forces each terminal that is in a bulk transfer mode to guarantee a certain capacity to terminals upstream from itself. That certain capacity is equal to the capacity that it allocates to itself. Alas, it can happen that this unused capacity remains idle, which will occur when the upstream terminals are not transmitting. Since it makes no sense to leave this extra capacity idle, in accordance with our method, each terminal is permitted to populate all the data slots that it finds unpopulated, after it passes the required number of unpopulated slots.

Figure 5:
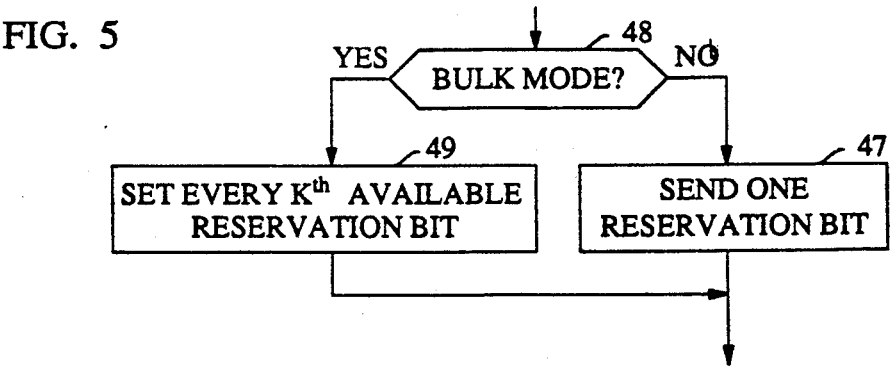

A flowchart that describes this flow control embodiment is shown in FIG. 5. Block 48 determines whether the terminal's source is in a bulk transfer mode. If it is not, one reservation bit is sent by block 47 for the packet waiting in source 13. If the source is in a bulk transfer mode, block 49 sets every $K^{th}$ available reservation bit.

In accordance with the above, setting every $K^{th}$ unset reservation bit results, in effect, in a reservation bits rate sequence that is different for each of the terminals that are in a bulk transfer mode. As illustrated above, if $K=2$, then the sequence is $\frac{1}{2}, \frac{1}{4}, \frac{1}{8}$, etc.

Figure 6:
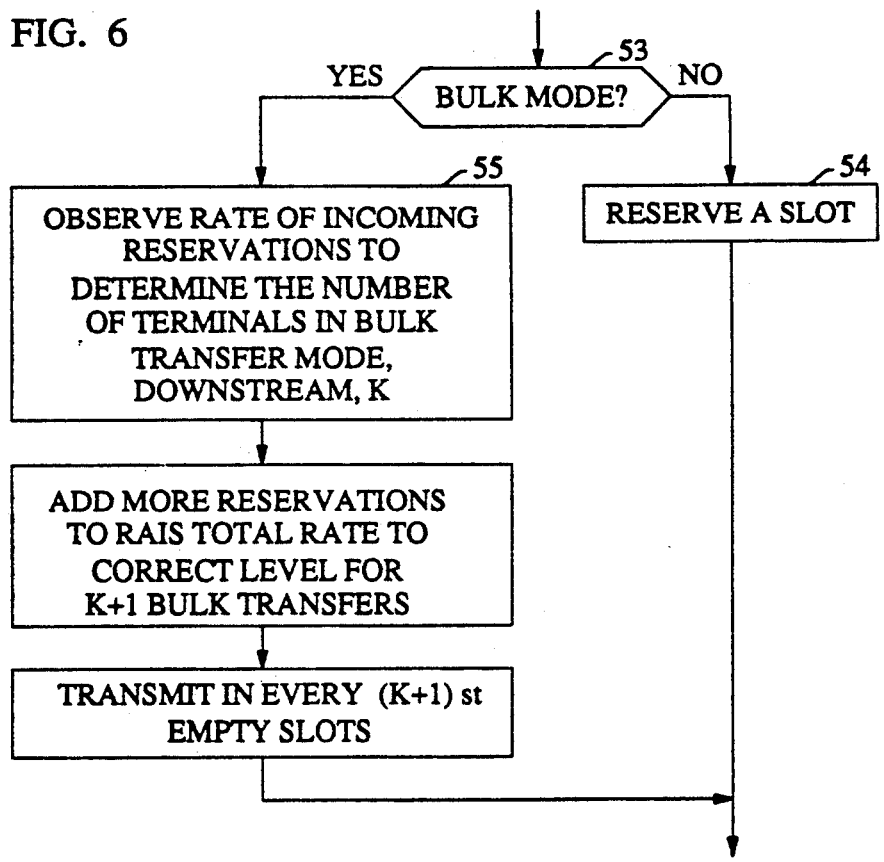

Actually, the reservation bits rate sequence can be used not so much for determining the number of data slots that a terminal will be permitted to populate but, rather, to determine the number of down stream terminals that are in a bulk transfer mode. That is, given some chosen sequence $\{x_1, x_2, x_j\}$, one can control the reservation bits rate sent by each terminal and through this control the number of down-stream terminals that are in a bulk transfer mode can be ascertained locally by each terminal. The concept is that a reservation bits rate of $x_1$ corresponds to one terminal in a bulk transfer mode, a reservation bits rate of $x_2$ corresponds to two terminals in a bulk transfer mode, etc. Accordingly, when terminal M determines that the incoming reservation bits rate is greater than or equal to $x_k$ but less than $x_{k+1}$ then the terminal concludes that there are k downstream terminals in a bulk transfer mode. If terminal M is also in a bulk transfer mode, then it sets reservation bits in sufficient number to raise the total reservation bits rate to $x_{k+1}$. Separately and apart from the number of reservation bits that were set by the terminal, data is transmitted on bus 12 in accordance with the knowledge about the number of terminals down stream from itself that are in a bulk transfer mode. If a terminal knows, for example, that there are three terminals down-stream from itself that are in a bulk transfer mode, then it can acquire for itself $\frac{1}{4}$ of the available capacity and leave $\frac{3}{4}$ of the available capacity for the downstream terminals. This approach is depicted in FIG. 6.

Yet another approach for providing a fair allocation of the transmission resource is to 1) leave a portion of the transmission capacity unused, and
2) employ the unused transmission capacity as the driving force for throttling the terminals that seek to use an excessive proportion of the capacity.

In this approach each terminal throttles itself to use only a fraction $\alpha$ of the slots unused by other terminals, where the term "unused" refers to data slots that are neither set busy nor reserved by other terminals. For example, in a situation where only two terminals are active, one terminal transmits at rate X, and the other transmits at rate Y. The one that transmits at rate X throttles X to $(1-Y)\alpha$, and likewise, the one that transmits at rate Y throttles Y to $(1-X)\alpha$. Solution of these two equations results in both X and Y being equal to $\alpha/(1+\alpha)$. In the case of $\alpha$ being equal to 0.95, X and Y are each equal to 0.95/1.95, and the remaining unused capacity is 0.05/1.95.

Use of the "two equations—two unknowns" approach above is merely illustrative, of course. The contemplated approach does not require any complex computations, and each terminal operates only on the information that is available to it locally. The throttling of each terminal does occur in an iterative sequence, but each terminal arrives independently at its proper transmission rate.

The rate of convergence is better for smaller values of $\alpha$. The more unused capacity one is willing to accept, the faster the convergence becomes. For example, for an $\alpha$ equal to 0.9, when at first a terminal A begins to transmit, it transmits at 0.9 of channel capacity, leaving 0.1 unused. When a terminal B begins to transmit, it sees only 0.1 unused capacity and, therefore, it transmits only at 0.09 of channel capacity. Now, terminal A sees only 0.91 unused capacity so it throttles itself to 0.819 of channel capacity. That leaves 0.181 unused capacity for terminal B, so it increases its transmission rate to 0.1629 of channel capacity. The process continues until an equilibrium is approached for a rate of 0.9/1.9 for each of the two terminals. With α being set to 0.8, terminal A moves more quickly towards the final rate of 0.8/1.8 (the sequence is 0.8, 0.672, 0.590 . . . ). Thus, all that a terminal needs to do is to assess the available capacity and throttle itself accordingly.

One aspect of the above-described iterative self-throttling is that the each of the terminals in the network, independently, can choose the value of α and can vary that value as the need arises. Thus, when a sudden change in the network load is detected, such as when a new terminal turns on to operate in a bulk transfer mode, the terminals can pick a smaller α to more quickly approach an equilibrium, and then increase α to improve the system's utilization of the transmission capacity.

Figure 7:
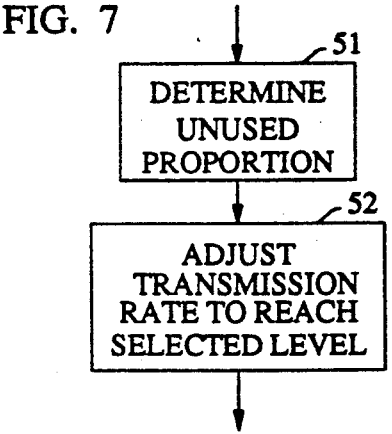

FIG. 7 depicts the flowchart describing the above approach. Block 51 evaluates the proportion of the transmission capacity that is unused. Based on that evaluation, block 52 adjusts the terminal's transmission rate to result in the specified fraction of the unused transmission capacity.

In a still further improvement, a measure of the unused capacity can be assured by simply requiring each terminal to not populate some of the empty and unreserved slots. When a terminal populates only n slots for every n+1 available slots, some capacity remains unused.

This approach differs from the approach described above in that the previous approach contemplates evaluating the actual and expected load on bus 12 (i.e. busy bits and reservation bits); based on the evaluation, the terminal's own reservation rate and transmission rate are determined. In other words, some computations are required. In accordance with the latter approach, the reservation bits of down-stream terminals are accounted for only in the sense of making sure that a sufficient number of empty slots remain unpopulated. As for the terminal's own transmission rate, it is simply, a decision to populate n empty and unreserved slots out of every n+1 such slots.

There are two simple embodiments for this method. In the first embodiment, a terminal services the requests from down-stream terminals with absolute priority. Only the Request counter is needed in each transmitter-receiver module. The counter is incremented with the arrival of request bits on bus 11 and is decremented with the passing of unpopulated empty slots on bus 12. When the value of the counter reaches 0, n slots are populated for every n+1 empty slots.

It may be noted that from time to time the value of n may be changed. This variation frees the system from the n/(n+1) fraction. Any fraction can be thereby approximated.

The other implementation is similar to the standard 802.6 protocol in that the Request counter and the Count-down counter are used. The only difference is that when the Count-down counter reaches 0, the terminal transmits the packet and the Request counter is artificially incremented by one.

The hardware needed for the various determinations described above is quite simple, because mostly accumulations of bits (and counting) are required. The applications is not burdened with the conventional circuit details since it is expected that practitioners will have no difficulty whatsoever in assembling the necessary circuits. It should be understood, of course, that the specific details disclosed above are merely illustrative of the principles of our invention and that various changes to the specifics of our implementations can be introduced without departing from the spirit and scope of our invention.

We claim:

1. In a packet communications arrangement where terminals communicate packets containing reservation bit and a busy bit, in predefined time slots of a first bus coupled to said terminals, and where those of said terminals that wish to transmit a packet on said first bus reserve a slot on said first bus by setting a reservation bit of a packet on a second bus coupled to said terminals, said first bus and said second bus having a transmission capacity of N time slots per second each, where N is a constant, A METHOD, carried out in at least one terminal of said terminals, for acquiring capacity to transmit packets on said first bus, comprising the steps of:

said one terminal determining, solely from said busy bit of each packet on said first bus and said reservation bit of each packet on said second bus, the proportion of slots of said first bus that are either occupied by or are reserved for packets of other terminals; and said one terminal controlling, based on said step of determining, its rate of packet transmissions on said first bus to not exceed a predefined portion of the transmission capacity of said first bus when said step of determining indicates that said first bus is occupied by more than the transmission of its own packets.

2. The method of claim 1 wherein said step of controlling sets an upper bound on the rate of packet transmission of said one terminal.

3. The method of claim 2 wherein said upper bound is a chosen fraction of the transmission capacity of said first bus.

4. The method of claim 1 wherein said step of controlling affects the rate of packet transmission of said one terminal when said one terminal transmits at above a chosen proportion of the packet transmission capacity of said first bus.

5. The method of claim 2 wherein said upper bound is ½ N time slots per second.

6. The method of claim 2 wherein said upper bound is a chosen fraction of the transmission capacity of said first bus, less the slots of said bus that are either occupied by or are reserved for packets of other terminals.

7. In a communications system having a plurality of terminals, a METHOD carried out by one terminal of said plurality of terminals, for insuring that when said one terminal chooses to transmit information in a bulk transfer mode occupies, it appropiates not more than predetermined proportion of the transmission capacity of said communication system, relative to other of said terminals that transmit in a bulk transfer mode, comprising the steps of:

said one terminal ascertaining the level of unused transmission capacity in said communications system; and in response to said step of ascertaining, said one terminal setting a rate for its own transmission of information to a level that occupies no more than a preselected fraction of said unused transmission capacity.

8. The method of claim 5 wherein said preselected fraction is related to said unused transmission capacity that is determined by said step of ascertaining.

9. A method carried out by a terminal in a communications system having a plurality of terminals, for insuring that in choosing to transmit information in a bulk transfer mode, said terminal occupies more than an undue proportion of the transmission capacity of said communication system, comprising the steps of:

said terminal ascertaining degree of unused capacity in said communications system;

said terminal setting first rate for its own transmission of information to a level that occupies no more than a preselected proportion of said unused capacity, with said first rate being employed when
1) said terminal is called upon to transmit a block of packets in excess of a preselected number of packets, and
2) other of said terminals are transmitting at a rate greater than a selected threshold; and said terminal setting a second rate for its transmission of information that is higher than said first rate when
1) said terminal is called upon to transmit a block of packets in excess of a preselected number of packets, and
2) other of said terminals are not transmitting at a rate greater than said selected threshold.

10. A terminal having a first port for coupling information to and from a first communications line and a second port for coupling information to and from a second communications line, comprising:

first means for acquiring information to be transmitted;

second means, responsive to said first means, for communicating said information to said first port whenever said first means acquires said information to be transmitted over said first port and said first port is unburdened with information from other terminals connected to said first communications line;

third means responsive to said first port for determining the proportion of time that said first port is burdened with information from said other terminals; and fourth means responsive to said third means for controlling said first and second means to limit the rate of said communicating said information to said first port to a preselected fraction of the transmission capacity of said communications line that is unused by information that already occupies a portion of said transmission capacity.

11. The terminal of claim 10 wherein said third means is responsive to data about information that occupies a portion of said transmission capacity of said first communications line and to data about information that is scheduled to occupy a portion of said transmission capacity of said first communications line.

12. The terminal of claim 11 wherein said third means derives said data about information that is scheduled to occupy a portion of the transmission capacity of said first communications line from said second port.

13. The terminal of claim 12 wherein said data about information that is scheduled to occupy a portion of the transmission capacity of said first communications line is in the form of reservation bits, with each reservation bit reserving one empty slot, and wherein said fourth means
a) limits said rate of said communicating, when reservation bits are present, to a selected fraction of the transmission capacity of said first communications line, which fraction corresponds to a portion of said capacity that is not already occupied, and
b) limits said rate of said communicating, when no reservation bits are present, to allow transmitting over all of the unoccupied transmission capacity of said first communications line.

14. The terminal of claim 11 wherein said fourth means limits said rate to a selected fraction of the total capacity less the sum of
a) the transmission capacity of said first communications line that is already occupied, and
b) the transmission capacity scheduled to be occupied.

15. The terminal of claim 14 wherein said selected fraction is adjustable.

16. A terminal having a first port for connection to a first communications line, a second port for connection to a second communications line, means for transmitting packets of information to said first port, means for reserving capacity at said first port by sending reservation bits to said second port, and means for controlling said means for transmitting packets to regulate transmission in accordance with available capacity at said first port and in accordance with the reservation bits sent to said second port, the improvement comprising:

control means responsive to said first port and to said second port for determining the proportion of time that said first port has available capacity and for controlling said means for reserving to send reservation bits in sufficient number to provide said terminal with a proportion of the transmission capacity of said first port that is commensurate with the capacity used by other terminals.

17. The terminal of claim 16 wherein said control means directs said means for reserving to send reservation bits in sufficient number to insure a specified unused capacity at said first port.

18. A terminal including means for interacting with a first transmission channel and a second transmission channel in accordance with protocol IEEE 802.6, the improvement comprises:

first means for ascertaining level of available transmission capacity at said first transmission channel; and second means responsive to said first means for casting reservation bits on said second transmission channel and for sending data packets on said first transmission channel in proportion to said level of available transmission capacity wherein said proportion is a fraction that is less than 1.

19. A terminal including means for interacting with a first transmission channel and a second transmission channel in accordance with protocol IEEE 802.6, the improvement comprises:

means for sending reservation bits on said second transmission channel and for sending a corresponding number of data packets on said first transmission channel with said number being smaller than the total capacity less the sum of the transmission capacity of said first communications line that is already occupied, and the transmission capacity scheduled to be occupied.

20. The method of claim 1 wherein said step of controlling rate of packet actively throttles transmission to refrain from transmitting over some available capacity 21. The method of claim 1 wherein said step of controlling rate of packet transmission ascertains the number of down-stream terminals that are in a bulk transfer mode and throttles its rate of packet transmission to permit relatively equal distribution of the transmission capacity among the terminals that are in a bulk transfer mode.

22. The terminal of claim 10 wherein said third means is responsive to data about informations that occupies a portion of said transmission capacity of said first communications line and to reservation bits data at said second port about information that is scheduled to occupy a portion of said transmission capacity of said first communication line.

23. The terminal of claim 10 wherein said third means is responsive to data about information that occupies a portion of said transmission capacity of said first communications line and to reservation bits data at said second port, and said third means determines from said reservation bits data the number of terminals, downstream from said terminal, that are in a bulk transfer mode.

* * * * *